United States Patent
Arai et al.

(10) Patent No.: US 12,549,228 B2
(45) Date of Patent: Feb. 10, 2026

(54) COMMUNICATION EQUIPMENT, CONTROL METHODS AND PROGRAMS

(71) Applicant: NIPPON TELEGRAPH AND TELEPHONE CORPORATION, Tokyo (JP)

(72) Inventors: Takuto Arai, Musashino (JP); Daisei Uchida, Musashino (JP); Tatsuhiko Iwakuni, Musashino (JP); Shuki Wai, Musashino (JP)

(73) Assignee: NTT, Inc., Tokyo (JP)

(*) Notice: Subject to any disclaimer, the term of this patent is extended or adjusted under 35 U.S.C. 154(b) by 33 days.

(21) Appl. No.: 18/293,682

(22) PCT Filed: Aug. 3, 2021

(86) PCT No.: PCT/JP2021/028762
§ 371 (c)(1),
(2) Date: Jan. 30, 2024

(87) PCT Pub. No.: WO2023/012895
PCT Pub. Date: Feb. 9, 2023

(65) Prior Publication Data
US 2025/0119189 A1 Apr. 10, 2025

(51) Int. Cl.
*H04B 7/06* (2006.01)
*H04W 16/28* (2009.01)

(52) U.S. Cl.
CPC .......... *H04B 7/0617* (2013.01); *H04W 16/28* (2013.01)

(58) Field of Classification Search
CPC .............................. H04B 7/0617; H04W 16/28
See application file for complete search history.

(56) References Cited

U.S. PATENT DOCUMENTS

| | | |
|---|---|---|
| 2016/0309396 A1 | 10/2016 | Chai et al. |
| 2021/0160707 A1* | 5/2021 | Suzaki ............... H04B 7/0617 |
| 2025/0119189 A1* | 4/2025 | Arai .................... H04B 7/0695 |

FOREIGN PATENT DOCUMENTS

| | | | |
|---|---|---|---|
| EP | 3734851 A1 | 11/2020 | |
| JP | 2020-005182 A | 1/2020 | |
| WO | WO-2020004010 A1 * | 1/2020 | .......... B64C 39/024 |

OTHER PUBLICATIONS

Takeda et al., "NR Physical layer Specification in 5G", NTT DOCOMO Technical Journal, vol. 26, No. 3, pp. 47 to 58, Nov. 2018.

Kojima et al., "Study and experimental evaluation on 2-step beam search method in Millimeter-wave communications", IEICE Technical Report, vol. 116, No. 396, RCS2016-237, pp. 7-11, Jan. 2017.

* cited by examiner

*Primary Examiner* — Jaison Joseph
(74) *Attorney, Agent, or Firm* — Harness, Dickey & Pierce, P.L.C.

(57) ABSTRACT

According to embodiment of the present invention, a communication equipment includes an acquirer configured to acquire obstruction information including a distance from a radiator radiating a beam to an obstruction obstructing the beam; a derivator configured to derive a beam width of the beam radiated from the radiator in accordance with the distance to the obstruction acquired by the acquirer; and a beam controller configured to control the radiator such that the beam is radiated with the beam width derived by the derivator.

11 Claims, 6 Drawing Sheets

| BEAM | B1 | B2 | B3 | B4 | B5 | B6 |
|---|---|---|---|---|---|---|
| DIRECTION | θ1 | θ2 | θ3 | θ4 | θ5 | θ6 |
| WIDTH | W1 | W2 | W3 | W4 | W5 | W6 |

| BEAM | b1 | b2 | b3 | b4 | b5 |
|---|---|---|---|---|---|
| DIRECTION | τ1 | τ2 | τ3 | τ4 | τ5 |
|  | φ1 | φ2 | φ3 | φ4 | φ5 |
| WIDTH | w1 | w2 | w3 | w4 | w5 |

COMMUNICATION EQUIPMENT, CONTROL METHODS AND PROGRAMS

CROSS-REFERENCE TO RELATED APPLICATIONS

This application is a 371 U.S. National Phase of International Application No. PCT/JP2021/028762, filed on Aug. 3, 2021. The entire disclosure of the above application is incorporated herein by reference.

TECHNICAL FIELD

The present invention relates to a technology for communication equipment, control methods and programs.

BACKGROUND ART

In a communication system such as 5G, a high frequency band of a millimeter wave band is used. To realize a higher speed and a larger capacity in a radio communication system such as 6G of the related art, it is assumed that a higher frequency band in which a broader bandwidth can be ensured will be used.

Since a high frequency band leads to large propagation loss and a short wavelength, the number of antenna elements is increased to perform beamforming, so that a gain can be guaranteed and a communication area can be covered. Before connection between a base station and a terminal and in a state where the connection is disconnected (in initial connection), an appropriate beam direction is not known. Therefore, beam search for estimating an appropriate beam direction is required.

Figure 7:
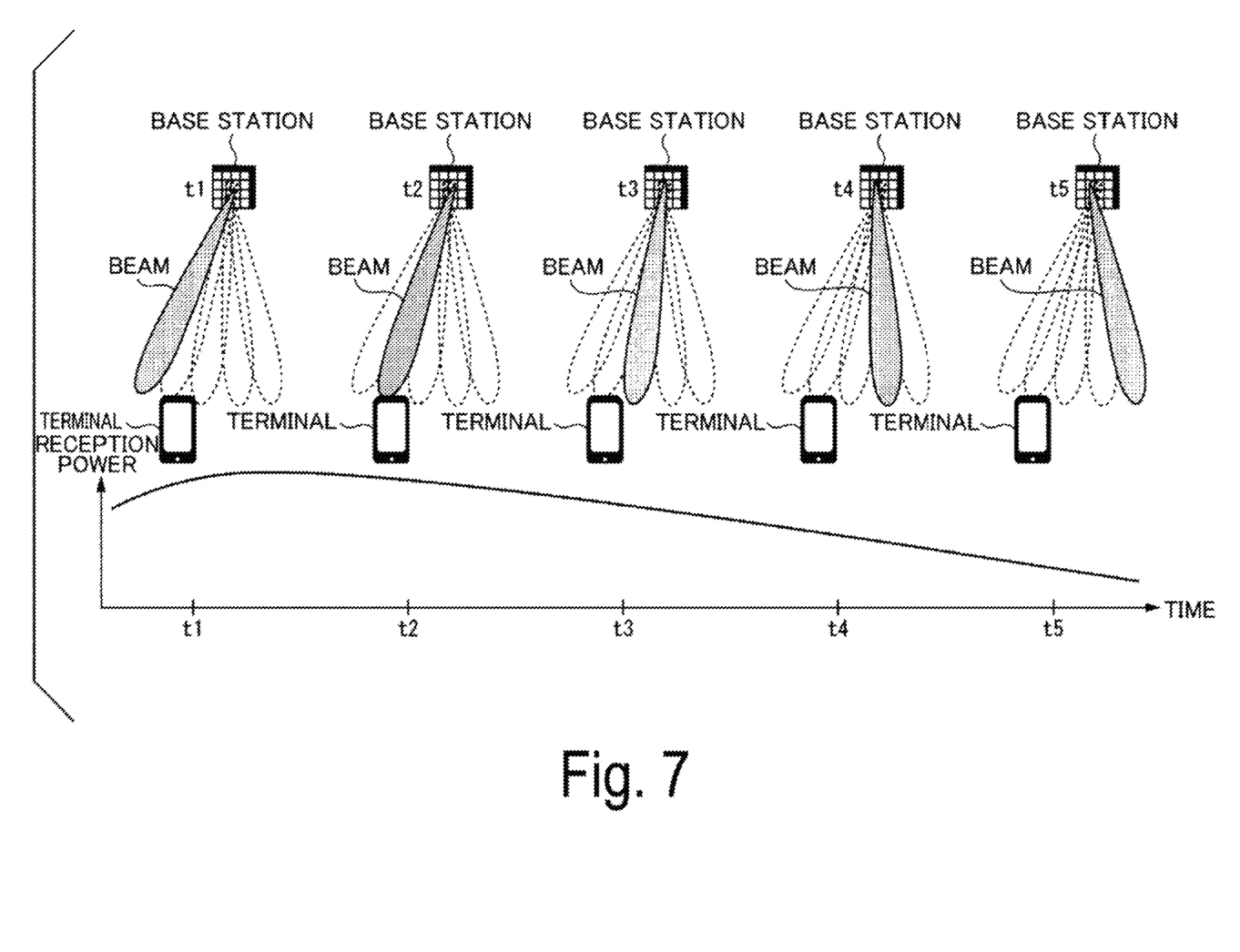
FIG. 7 is a diagram illustrating a technique of the related art.

FIG. 7 illustrates beam search in 5G new radio (NR). FIG. 7 shows base stations, terminals, and reception power of the terminals. A positional relationship between the base station and the terminal is also illustrated. The terminals are located slightly to the right from a viewpoint of the base stations. A change in a radiation direction of a beam from times t1 to t5 and a change in the reception power are also illustrated. As illustrated in FIG. 7, the reception power of the terminal increases as the beam direction is closer to the terminal.

In this way, in the initial connection in the 5G NR, beam sweeping is performed comprehensively within the coverage, and a full search type beam search for selecting a beam with highest reception power is performed (refer to NPL 1).

Figure 8:
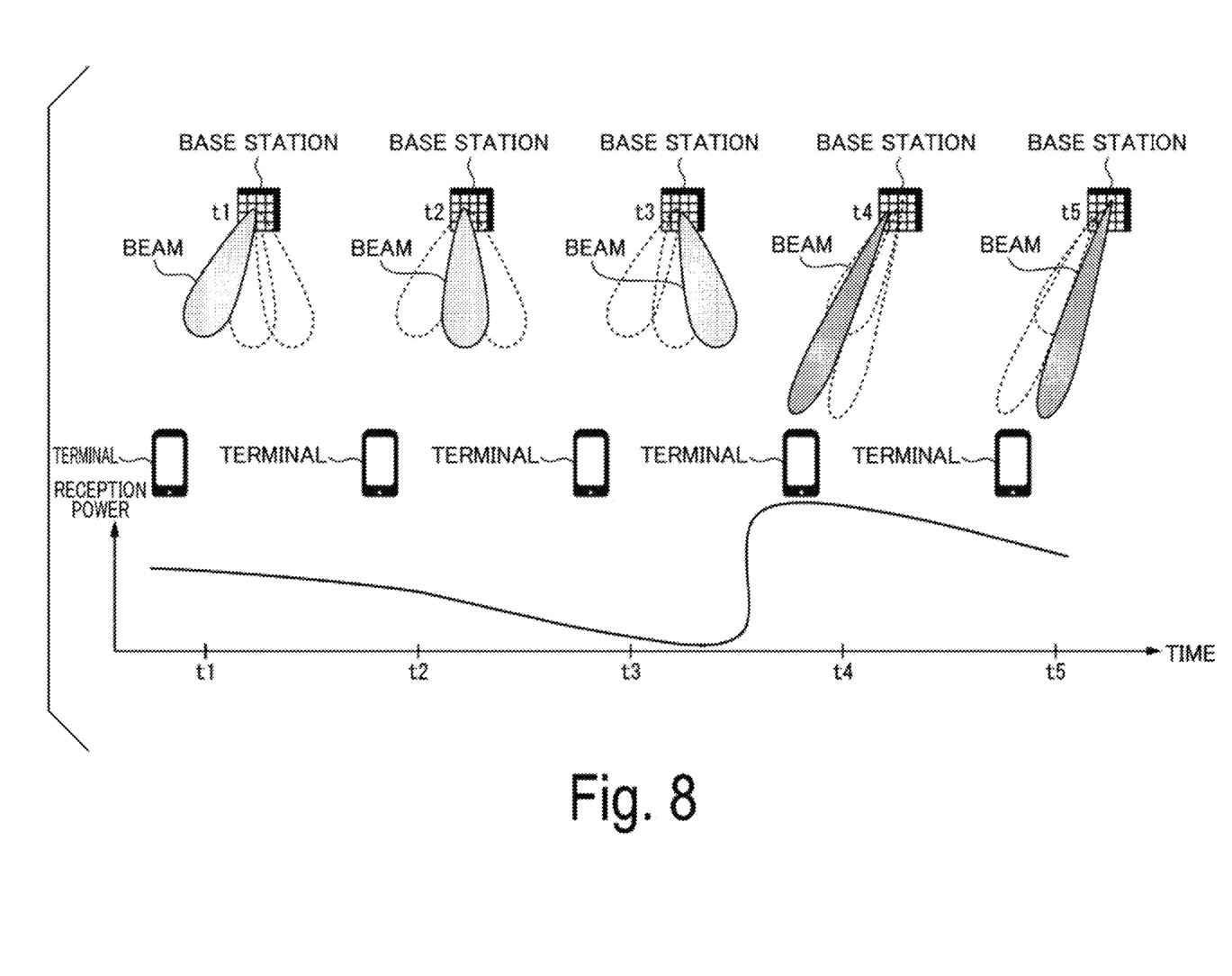
FIG. 8 is a diagram illustrating a technique of the related art.

FIG. 8 is a diagram illustrating hierarchical beam search. Like FIG. 7, FIG. 8 illustrates base stations, terminals, and reception power of the terminal. A positional relationship between the base station and the terminal is also illustrated. The terminals are located slightly to the right from a viewpoint of the base stations. A change in a radiation direction of a beam from times t1 to t5 and a change in the reception power are also illustrated.

As illustrated in FIG. 8, in the hierarchical beam search, sweeping is performed with a beam with a wide beam width in a first stage (t1, t2, t3). In a second stage (t4, t5), sweeping is performed by a beam with a beam width narrower than that of the beam in the first stage. In this way, a technique for reducing the number of beam searches by performing hierarchical beam search has been proposed. In the hierarchical beam search, the beam search in the second stage can be performed individually for each user, and the multicast can be performed simultaneously for all the terminals (see NPL 2).

CITATION LIST

Non Patent Literature

[NPL 1] Takeda, et al., "NR Physical layer Specification in 5G," NTT DOCOMO Technical Journal, Vol. 26, No. 3, pp. 47 to 58, November 2018.

[NPL 2] Kojima, et al., "Study and Experimental Evaluation on 2-stage Beam Search System in Millimeter Wave Communications," IEICE Technical Report, Vol. 116, No. 396 RCS 2016-237, pp. 7 to 11, January 2017.

SUMMARY OF INVENTION

Technical Problem

The higher a frequency band is, the higher propagation attenuation is. Therefore, it is necessary to increase a beamforming gain by narrowing a beam width. As a method of narrowing the beam width, widening an antenna aperture area through an increase in the number of antenna elements, use of a lens, or the like can be considered.

On the other hand, when the beam width is narrowed, directivity becomes strong, and thus the number of searches increases when the beam sweeping for covering a spatial region is performed. Therefore, overhead associated with the beam search increases. If the beam width is increased to reduce the overhead, a beamforming gain is decreased, which leads to a reduction of the coverage.

In the above-described hierarchical beam search, the number of beam searches increases in proportion to the number of terminals when the beam search at the second stage is performed for each terminal. When the beam search is simultaneously performed in the second stage in al the terminals and users are uniformly distributed within the coverage, it is necessary to perform the beam search comprehensively, and the number of beam searches is equal to that of the full search type beam search.

In this way, there is a problem that it is not easy to achieve both a reduction in overhead of the beam search and guaranteed coverage.

In view of the foregoing circumstances, an object of the present invention is to provide a technique capable of reducing overhead of beam search while guaranteeing coverage.

Solution to Problem

According to an aspect of the present invention, a communication equipment includes: an acquirer configured to acquire obstruction information including a distance from a radiator radiating a beam to an obstruction obstructing the beam; a derivator configured to derive a beam width of the beam radiated from the radiator in accordance with the distance to the obstruction acquired by the acquirer; and a beam controller configured to control the radiator such that the beam is radiated with the beam width derived by the derivator.

According to another aspect of the present invention, a control method for a communication equipment includes: an acquisition step of acquiring obstruction information including a distance from a radiator radiating a beam to an obstruction obstructing the beam; a derivation step of deriving a beam width of the beam radiated from the radiator in accordance with the distance to the obstruction acquired in the acquisition step; and a beam control step of controlling the radiator such that the beam is radiated with the beam width derived in the derivation step.

According to still another aspect of the present invention, a a program causing a computer to function as a control equipment causes the computer to function as: an acquirer configured to acquire obstruction information including a distance from a radiator radiating a beam to an obstruction obstructing the beam; a derivator configured to derive a beam width of the beam radiated from the radiator in accordance with the distance to the obstruction acquired by the acquirer; and a beam controller configured to control the radiator such that the beam is radiated with the beam width derived by the derivator.

Advantageous Effects of Invention

According to the present invention, it is possible to reduce overhead of beam search.

DESCRIPTION OF EMBODIMENTS

An embodiment of the present invention will be described in detail with reference to the drawings.

Figure 1:
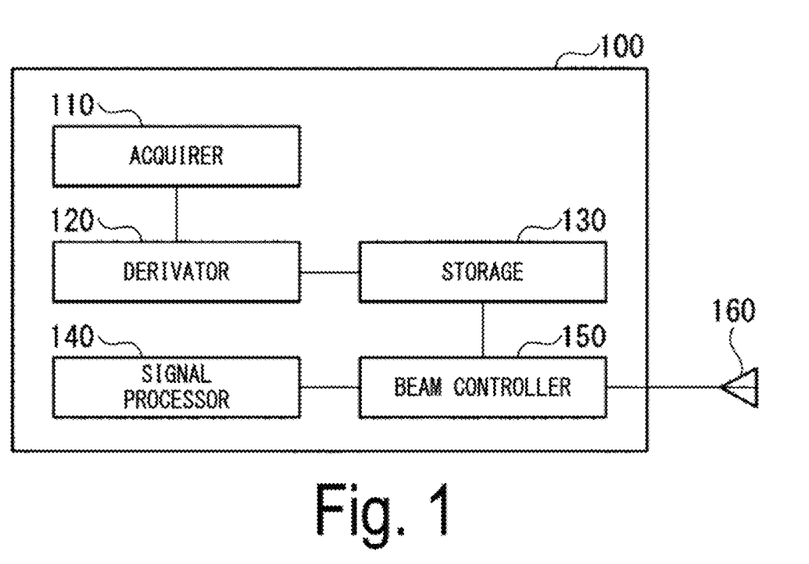
FIG. 1 is a block diagram illustrating a configuration of a communication equipment 100.

FIG. 1 is a block diagram illustrating a configuration of a communication equipment 100 according to the embodiment. The communication equipment 100 includes an acquirer 110, a derivator 120, a storage 130, a signal processor 140, a beam controller 150 and an antenna 160.

The acquirer 110 acquires obstruction information including a distance to an obstruction obstructing a beam from the antenna 160. Specifically, the acquirer 110 acquires, as the obstruction information, a distance to the obstruction from the antenna 160 in a predetermined area (hereinafter referred to as "communication area"), a direction of the obstruction from the antenna 160, a size of the obstruction, and the like. As a method of acquiring the obstruction information, a method of acquiring sensing information obtained through sensing using radio waves, light waves, sound waves, or the like, an image photographed by a camera, 3D map data, or the like can be exemplified. The sensing information, the image photographed by the camera, and the 3D map data may be input by, for example, an operator of the communication equipment 100.

The derivator 120 derives the beam width of the beam radiated from the antenna 160 in accordance with the distance to the obstruction acquired by the acquirer 110. Specifically, the derivator 120 obtains a difference between an arrival distance of the beam at a maximum beamforming gain and the distance to the obstruction. The derivator 120 calculates an allowable reduction amount of a required gain in each direction using a theoretical value of distance attenuation with respect to the difference. The derivator 120 calculates the number of antenna elements that can be reduced in the antenna 160 from the allowable reduction amount of the required gain and derives a beam width at the reduced number of antenna elements. Thus, the derivator 120 derives a beam width in which a communicable distance by the beam radiated by the antenna 160 is equal to or more than the distance to the obstruction. The derivator 120 sets the beam width of the beam in the direction in which there is no obstruction as a thinnest beam width.

When a beam width in which the arrival distance of the beam is completely equal to the distance to the obstruction is generated, the derivator 120 may derive the beam width in which the arrival distance of the beam is completely equal to the distance to the obstruction. However, since the beam width can be discretely controlled with regard to the reduction in the number of antenna elements, the beam width in which the arrival distance of the beam is completely equal to the distance to the obstruction is not always formed. Accordingly, when the beam width in which the arrival distance of the beam is completely equal to the distance to the obstruction cannot be formed, the beam width in which the arrival distance of the beam is greater than the distance to the obstruction and less than the arrival distance of the beam at the maximum beamforming gain is derived.

Further, when a communicable area is allowed to have a margin, adjacent beams may be partially overlapped by a distance to the obstruction or more or the beam width may be set to satisfy a distance direction of the communication area at a half-value width (for example, a beam width of a decrease of 3 dB) instead of an apex of the beam.

The storage 130 stores a combination of a direction of a beam in which a communication area can be covered with the beam and a beam width of the beam radiated in the direction of the beam. The signal processor 140 performs signal processing to perform radio communication.

The beam controller 150 converts a signal received from the signal processor 140 into a radio signal and outputs the radio signal to the antenna 160, and converts a radio signal received from the antenna into an electric signal and outputs the electric signal to the signal processor 140. The beam controller 150 controls the antenna 160 such that the beam is transmitted with the beam width derived by the derivator 120. Further, the beam controller 150 performs beamforming using the combination stored in the storage 130 and performs beam search. The antenna 160 is an example of a radiator. The antenna 160 includes a plurality of antenna elements.

When the derived beam width is directly passed from the derivator 120 to the beam controller 150, the storage 130 is not required. As such a configuration, for example, the acquirer 110 periodically acquires the obstruction information and derives the beam width in accordance with the acquired obstruction information.

Figure 2:
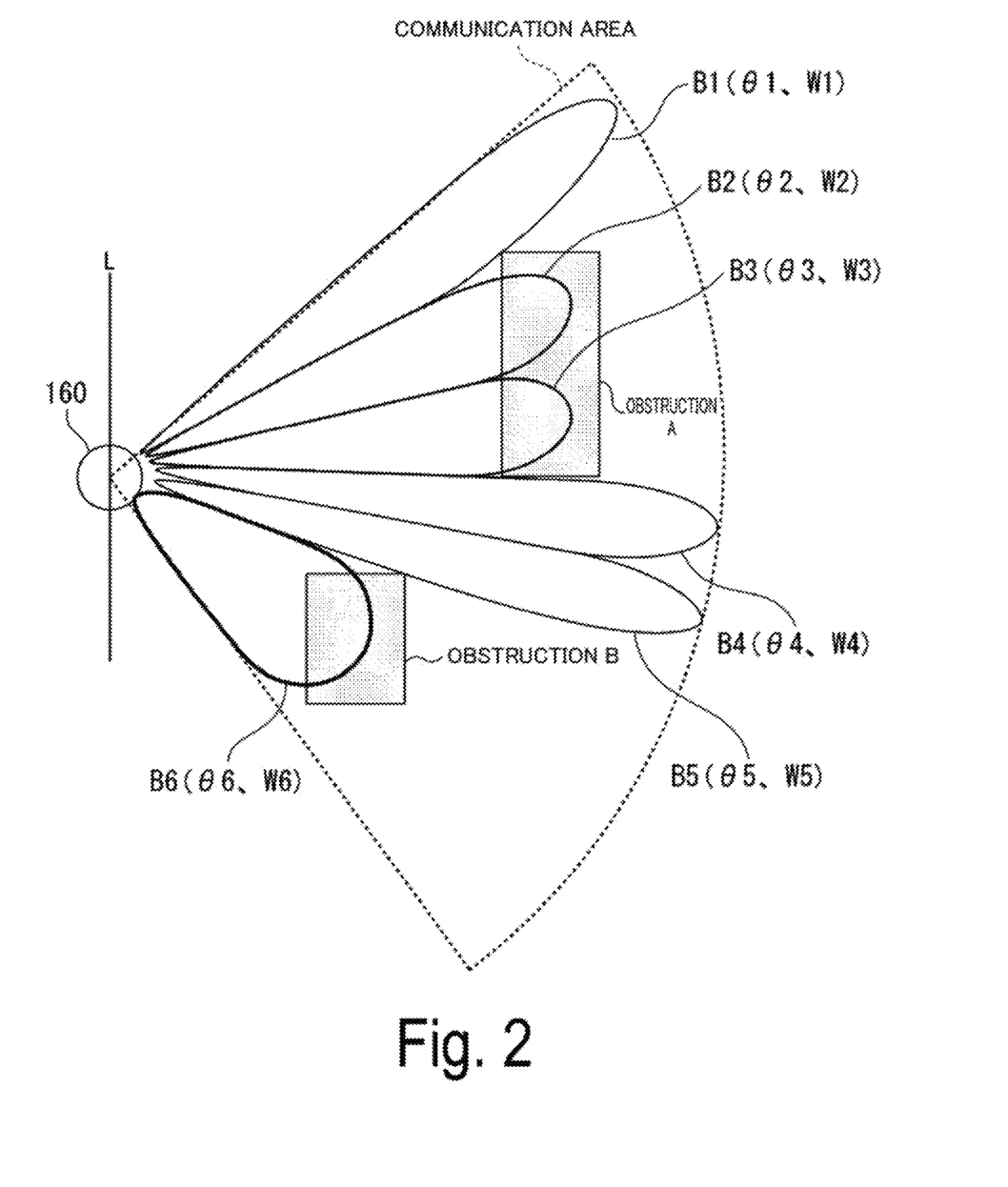
FIG. 2 is a diagram illustrating obstructions and beams.

FIG. 2 is a diagram illustrating the obstruction and the beam. FIG. 2 illustrates the antenna 160, six beams B1 to B6, and two obstructions A and B (for example, constructions such as buildings). A sector area indicated by a dotted line is a communication area. (θ, W) represents the angle of a beam direction of a beam and a beam width.

When there is an obstruction, radio waves are blocked by the obstruction. Therefore, there is a high probability of an area opposite to the antenna 160 with respect to the obstruction becoming an uncommunicable area. In particular, since a radio wave in a high frequency band has strong straightness and large attenuation, the radio wave has small wraparound and reflection properties, and this tendency becomes high.

Accordingly, when there is an obstruction in the communication area, a coverage in a distance direction is narrow in a direction in which the obstruction is located. Therefore, it can be expected that the required gain by beamforming can be reduced. When the required gain by beamforming becomes small, the number of antenna elements performing beamforming is thinned out to narrow an antenna aperture length and to widen the beam width. When the beam width becomes large, the number of beam searches can be reduced.

In FIG. 2, beams B1, B4, B5 are not blocked by the obstructions. Therefore, the beam widths of the beams B1, B4, B5 are thinnest beam widths. The beams B1, B4 and B5 are beams of the longest communicable distance by the antenna 160 (which is referred to as a longest beam). On the other hand, even if the longest beams are radiated in the direction of the obstructions A and B, areas opposite to the obstructions A and B are highly likely to be uncommunicable areas because of the above-described reasons.

Accordingly, in the directions of the obstructions A and B, the derivator 120 derives beam widths in which communicable distances by the beams radiated by the antenna 160 are equal to or more than distances to the obstructions. Beams B2, B3, B6 are beams radiated from the antenna 160 controlled such that the derived beam widths are obtained. As illustrated in FIG. 2, beam widths of the beams B2, B3, B6 are thicker than the beam widths of the beams B1, B4, and B5. Accordingly, the number of beams covering a communication area can be reduced compared to the technique of the related art in which search is performed with the beam widths of the beams B1, B4 and B5. By reducing the number of beams in this way, the number of beam searches is reduced. Therefore, it is possible to reduce overhead compared to the technique of the related art. Further, even if the number of beams is reduced, the areas opposite to the obstructions are uncommunicable areas even in the technique of the related art, and thus the communicable areas are not changed from the related art. FIG. 2 illustrates the beams and the obstructions on a two-dimensional plane, but it is conceivable that beams and the obstructions are illustrated in a 3-dimensional space in the same way.

Figure 3:
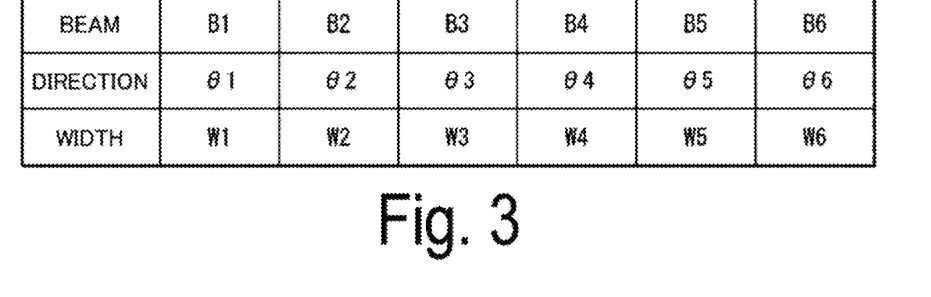
FIG. 3 is a diagram illustrating a combination example stored in a storage.

FIG. 3 is a diagram illustrating a combination example stored in the storage 130. The combination example illustrated in FIG. 3 corresponds to the beams illustrated in FIG. 2. The combination is configured with a direction θ and a width W. The direction θ indicates an angle formed by a line segment L and the direction of the beam illustrated in FIG. 2. That is, the angle is an angle formed by the line segment L on the ground and the direction of the beam projected on the ground when the ground is a plane. The width W indicates a beam width. The beam width is determined by the gain or the number of antenna elements, as described above. Accordingly, in the combination, the gain or the number of antenna elements may be used instead of the beam width. An elevation angle may be further used as an angle indicating a direction.

For a pattern of beams (for example, patterns indicating directions and widths of the beams) which can be generated by the communication equipment 100, an index (for example, a number) is assigned in advance. The storage 130 may store the combination using only the index. In this way, the combination can be stored without storing the directions and widths of the beams.

Figure 4:
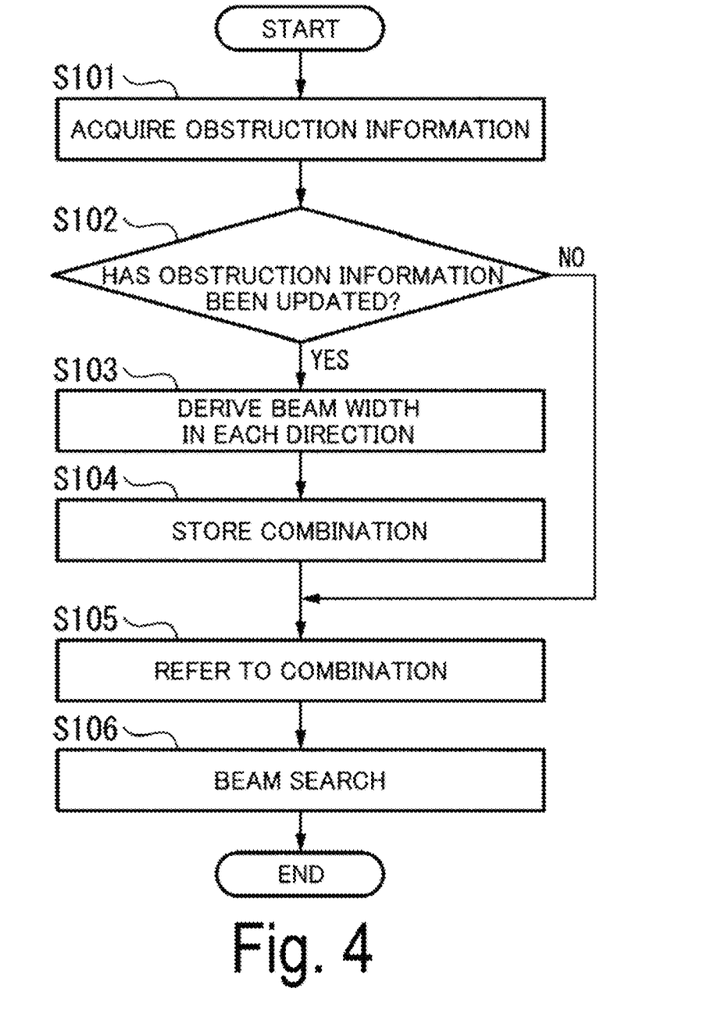
FIG. 4 is a flowchart illustrating a flow of processing of a control equipment.

FIG. 4 is a flowchart illustrating a flow of processing of the communication equipment 100. The acquirer 110 acquires the obstruction information (step S101). The acquirer 110 determines whether the obstruction information acquired in the step S101 has been updated from the previously acquired obstruction information (step S102). When the obstruction information acquired last time is not present, for example, when the obstruction information is acquired for the first time in the step S101, the obstruction information is assumed to be updated.

When the obstruction information is not updated from the obstruction information (No in step S102), the communication equipment 100 moves to step S105. When the obstruction information is updated from the obstruction information (step S102: Yes), the derivator 120 derives a beam width in accordance with the obstruction information such as a distance for each direction of the communication area (step S103).

The storage 130 stores the combination of the direction of the beam and the beam width of the beam radiated in the direction of the beam using the beam width derived by the derivator 120 (step S104). Here, when the combination has already been stored, the storage 130 stores the combination through overwriting to update the combination. The beam controller 150 refers to the stored combination (step S105) and performs the beam search (step S106).

In the beam search, the communication equipment 100 generates a beam sweeping signal in which a beam ID with which each beam can be uniquely specified is embedded as digital information. The communication equipment 100 loads the beam sweeping signal on each beam switching and generated chronologically to transmit the beam sweeping signal. The terminal measures reception power of each beam, reads the beam ID embedded in the beam sweeping signal, determines whether quality of the beam of a certain transmission side is good, and feeds a result back to the communication equipment 100. The communication equipment 100 selects a beam with good quality.

In the above-described flowchart, the acquisition of the obstruction information in step S101 may be periodically performed or may be performed only once before start of an operation of the communication equipment 100.

Figure 5:
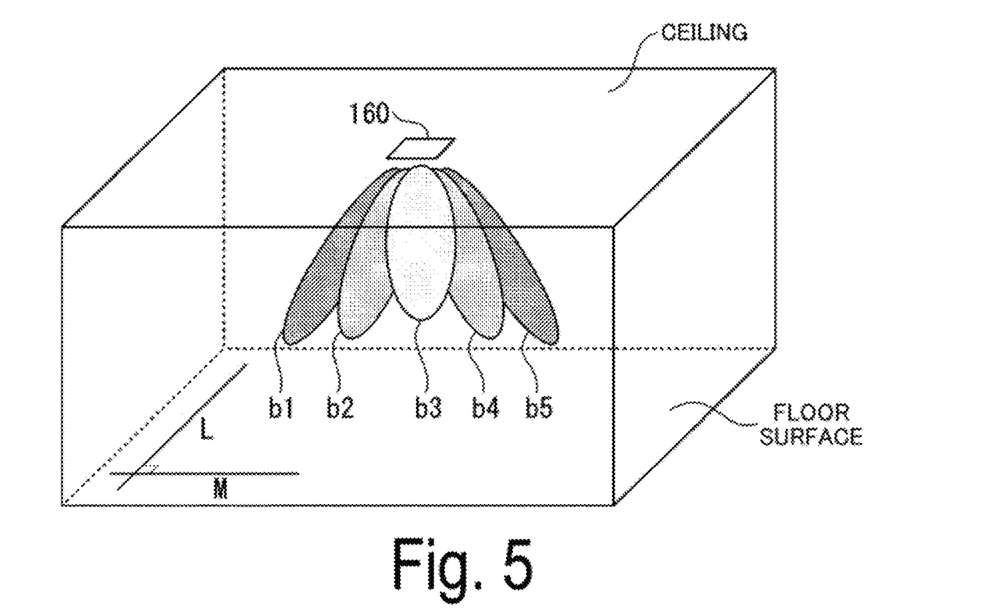
FIG. 5 is a diagram illustrating a beam mode when an antenna is provided on a ceiling.

In the above-described embodiments, the obstruction is assumed to be a construction such as an outdoor building, but there is also an obstruction indoors. For example, when an antenna is provided on a ceiling, a floor surface blocks radio waves. Therefore, the floor surface is also an obstruction. FIG. 5 is a diagram illustrating a beam mode when the antenna 160 is provided on a ceiling. FIG. 5 illustrates five beams b1 to b5, a ceiling and a floor surface.

In the indoor case, the farther a distance of the floor surface from the antenna 160 is, the longer a distance from the antenna 160 is. Accordingly, since the derivator 120 derives a beam width according to the distance, the embodiment in the outdoor case can be applied as it is. In the indoor case, the farther a distance of the floor surface from the antenna 160 is, the narrower the beam width is.

Figure 6:
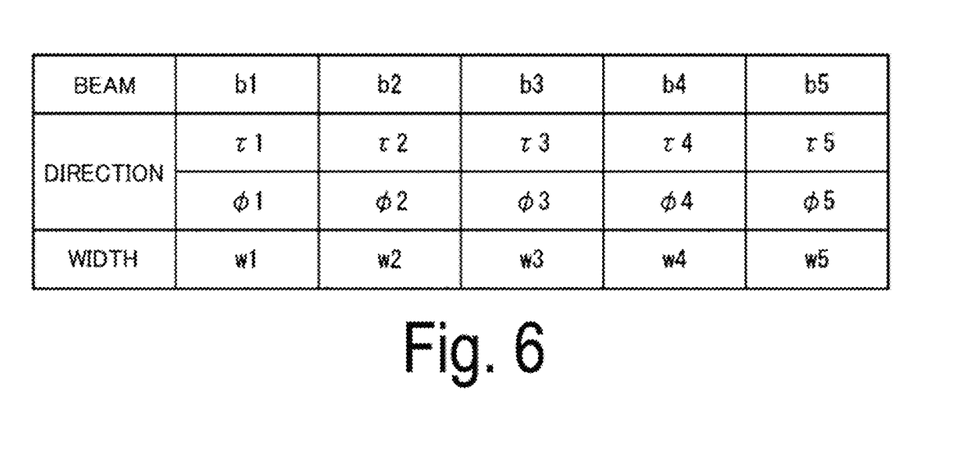
FIG. 6 is a diagram illustrating a combination example stored in the storage.

FIG. 6 is a diagram illustrating a combination example stored in the storage 130. The combination example illustrated in FIG. 6 corresponds to the beam illustrated in FIG. 5. The combination is configured with two angles t, o and a width w. The angle t indicates an angle formed by a line segment M in a direction perpendicular to the line segment L and a beam direction. The angle q is an angle formed by the line segment L on the floor surface and a direction of a beam projected to the floor surface. As in the case of FIG. 6, instead of the beam width, the gain or the number of antenna elements may be used in the combination. An index (for example, a number or the like) is previously assigned to a pattern of a beam (for example, a pattern indicating the direction and width of the beam) which can be generated by the communication equipment 100. The storage 130 may store the combination using only the index. In this way, the combination can be stored without storing the direction and width of the beam.

Although the communication equipment 100 includes the signal processor 140 in the above-described embodiment, the communication equipment 100 may have a configuration in which a signal processor is divided as a equipment such as a centralized unit (CU), a distributed unit (DU), and a radio unit (RU) in 5G NR. The acquirer 110 may be provided outside of the communication equipment 100.

Further, the beam search according to the present embodiment can be applied not only to a communication equipment or the like in a downlink but also to a terminal or the like in an uplink. The beam search according to the present embodiment can be applied not only to full search type beam search but also to beam search of each hierarchy of the hierarchical beam search. When the beam search according to the present embodiment is applied to the hierarchical beam search, the obstruction information is acquired, the beam width in each direction is derived with, for example, a range of a half distance of the longest beam as a communication area, and the first stage search is performed by the combination thereof. Subsequently, the beam width in each direction is derived using the range of the distance of the longest beam as a communication area and the second stage search is performed by the combination thereof.

The acquirer 110, the derivator 120, the storage 130, the signal processor 140, and the beam controller 150 may be configured using a processor such as a central processing unit (CPU) and a memory. In this case, for the acquirer 110, the derivator 120, the storage 130, the signal processor 140, and the beam controller 150, the processor executes a program to function as the acquirer 110, the derivator 120, the storage 130, the signal processor 140, and the beam controller 150. Some or all of the functions of the acquirer 110, the derivator 120, the storage 130, the signal processor 140, and the beam controller 150 may be implemented using hardware such as an application specific integrated circuit (ASIC), a programmable logic device (PLD), or a field programmable gate array (FPGA). The foregoing program may be recorded on a computer-readable recording medium. The computer-readable recording medium is, for example, a portable medium such as a flexible disk, a magneto-optical disc, a ROM, a CD-ROM, a semiconductor storage equipments (for example, a solid state drive (SSD)) or a storage equipment such as a hard disk or a semiconductor storage equipment built in a computer system. The foregoing program may be transmitted via an electric telecommunication line.

Although the embodiment of the present invention has been described in detail with reference to the drawings, a specific configuration is not limited to this embodiment, and design and the like within the scope of the gist of the present invention are included.

INDUSTRIAL APPLICABILITY

The present invention can be applied to a communication equipment performing beam search.

REFERENCE SIGNS LIST

100 Communication equipment
110 Acquirer
120 Derivator
130 Storage
140 Signal processor
150 Beam controller
160 Antenna

The invention claimed is:

1. A communication equipment comprising: an acquirer configured to acquire obstruction information including a distance from a radiator radiating a beam to an obstruction obstructing the beam; a derivator configured to derive a beam width for the beam radiated from the radiator; wherein the beam width is widening in accordance with the distance to the obstruction acquired by the acquirer; and a beam controller configured to control the radiator such that the beam is radiated with the beam width derived by the derivator.

2. The communication equipment according to claim 1, wherein the derivator derives a beam width in which a communicable distance by the beam radiated by the radiator is equal to or greater than the distance to the obstruction.

3. The communication equipment according to claim 1, wherein the obstruction information further includes a direction from the radiator to the obstruction.

4. The communication equipment according to claim 3, wherein the derivator sets the beam width of the beam in a direction in which the obstruction is not located as a narrowest beam width.

5. The communication equipment according to claim 4, further comprising a storage configured to store a combination of a direction of the beam in which a predetermined area is coverable with the beam and the beam width of the beam radiated in the direction of the beam.

6. The communication equipment according to claim 5, wherein the beam controller performs beam search using the combination stored in the storage.

7. The communication equipment according to claim 2, wherein the obstruction information further includes a direction from the radiator to the obstruction.

8. The communication equipment according to claim 1, wherein the derivator is configured to derive the beam width for the beam radiated from the radiator in a direction in which the obstruction is located, in accordance with the distance to the obstruction acquired by the acquirer, to be wider than in a direction in which the obstruction is not located, and the beam controller is configured to control the radiator to radiate the beam with the beam width derived by the derivator in the direction in which the obstruction is located, and to reduce the number of beams to reduce the number of beam searches.

9. Th com dication equipment according to claim 8, wherein the beam is for searching for a terminal.

10. A control method for a communication equipment, the method comprising: acquiring obstruction information including a distance from a radiator radiating a beam to an obstruction obstructing the beam; deriving a beam width for the beam radiated from the radiator; wherein the beam width is widening in accordance with the distance to the obstruction acquired; and controlling the radiator such that the beam is radiated with the beam width derived.

11. A non-transitory computer recording medium recording a program causing a computer to function as a communication equipment, the program causing the computer to function as: an acquirer configured to acquire obstruction information including a distance from a radiator radiating a beam to an obstruction obstructing the beam; a derivator configured to derive a beam width for the beam radiated from the radiator; wherein the beam width is widening in accordance with the distance to the obstruction acquired by the acquirer; and a beam controller configured to control the radiator such that the beam is radiated with the beam width derived by the derivator.

\* \* \* \* \*